(12) United States Patent
Kneer et al.

(10) Patent No.: US 8,713,225 B2
(45) Date of Patent: Apr. 29, 2014

(54) CONTROL UNIT INCLUDING A COMPUTING DEVICE AND A PERIPHERAL MODULE WHICH ARE INTERCONNECTED VIA A SERIAL MULTIWIRE BUS

(75) Inventors: Andreas Kneer, Köngen (DE); Axel Aue, Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 804 days.

(21) Appl. No.: 11/991,774

(22) PCT Filed: Sep. 1, 2006

(86) PCT No.: PCT/EP2006/065909
§ 371 (c)(1),
(2), (4) Date: Sep. 9, 2009

(87) PCT Pub. No.: WO2007/028771
PCT Pub. Date: Mar. 15, 2007

(65) Prior Publication Data
US 2010/0005215 A1    Jan. 7, 2010

(30) Foreign Application Priority Data
Sep. 7, 2005   (DE) .......................... 10 2005 042 493

(51) Int. Cl.
*G06F 13/38*    (2006.01)
(52) U.S. Cl.
USPC .............................. 710/71; 710/105; 710/315
(58) Field of Classification Search
USPC ..................... 710/64, 71, 105, 106, 305, 306, 710/313–315
See application file for complete search history.

(56) References Cited

U.S. PATENT DOCUMENTS

| 5,367,644 | A * | 11/1994 | Yokoyama et al. | 710/305 |
| 6,438,462 | B1 * | 8/2002 | Hanf et al. | 700/297 |
| 6,735,657 | B1 * | 5/2004 | Falk et al. | 710/305 |
| 7,308,595 | B2 * | 12/2007 | Windmueller | 713/500 |
| 2002/0083232 | A1 * | 6/2002 | Dute et al. | 710/31 |
| 2005/0138246 | A1 * | 6/2005 | Chen et al. | 710/71 |
| 2008/0082716 | A1 * | 4/2008 | Alfano | 710/313 |

FOREIGN PATENT DOCUMENTS

| DE | 196 11 942 | 10/1997 |
| DE | 196 11 944 | 10/1997 |
| JP | 3-275963 | 12/1991 |
| JP | 10-63389 | 3/1998 |
| JP | 10-266889 | 10/1998 |
| JP | 2002-342266 | 11/2002 |
| JP | 2004-9878 | 1/2004 |
| WO | WO 03/073725 | 9/2003 |

* cited by examiner

*Primary Examiner* — Khanh Dang
(74) *Attorney, Agent, or Firm* — Kenyon & Kenyon LLP

(57) ABSTRACT

A control unit includes at least one computing device and at least one separate peripheral module which is connected to the computing device via a serial multiwire bus, the peripheral module including at least one output stage for transferring serial data to means outside of the control unit. In order to keep the number of pins required on a peripheral module to a minimum, thereby reducing costs for the entire control unit, the peripheral module has an asynchronous single-wire interface between one interface for the serial multiwire bus and the output stage. The asynchronous single-wire interface is preferably a UART (universal asynchronous receiver/transmitter) interface. The serial multiwire bus is preferably a microsecond bus.

14 Claims, 1 Drawing Sheet

CONTROL UNIT INCLUDING A COMPUTING DEVICE AND A PERIPHERAL MODULE WHICH ARE INTERCONNECTED VIA A SERIAL MULTIWIRE BUS

FIELD OF THE INVENTION

The present invention relates to a control unit including at least one computing device and at least one separate peripheral module which is connected to the computing device via a serial multiwire bus, the peripheral module including at least one output stage for transferring serial data to means for implementing the motor vehicle function.

BACKGROUND INFORMATION

Economical control units having a simple construction are known from the related art in particular in the field of motor vehicles. These control units are used for controlling and/or regulating motor vehicle functions, for example the function of an internal combustion engine. These known control units include two integrated circuits, namely a module for a computing device or microcontroller and a peripheral module or peripheral chip. Among other things, a voltage supply, one or more output stages, and interface modules of the control unit are accommodated on the peripheral module.

According to the related art, the computing device and the peripheral module communicate with one another via a so-called microsecond bus (μs-bus). This is a serial bus having approximately 3 to 4 leads. This bus is similar to an SPI (serial peripheral interface) bus. Among other things, a security communication (for example a question and answer communication) between the computing device and the peripheral module takes place via the microsecond bus. Additional leads are also provided between the computing device and the peripheral module, for example for the voltage supply of the computing device.

The computing device of the known control unit also has a so-called UART (universal asynchronous receiver/transmitter) interface via which the serial data are transferred via another lead to the peripheral module from where they are forwarded to means outside of the control unit via the output stage of the peripheral component.

These are, for example, means for implementing the function of the motor vehicle to be controlled or regulated. In particular, such means are, for example, sensors, a diagnostic tester, a vehicle immobilizing system, etc.

A disadvantage of the known control units is the fact that a separate lead for the communication via the UART interface must be provided between the computing device and the peripheral module. This lead must also be connected to a separate pin of the peripheral module, thereby reducing the number of pins available on the peripheral module. However, the number of pins needed on the peripheral module should be kept as low as possible for reasons of cost.

SUMMARY OF THE INVENTION

Proceeding from this related art, an object of the present invention is to create a possibility for keeping the number of pins needed on a peripheral module to a minimum to be able to reduce costs for the entire control unit.

Proceeding from the control unit of the type described above, in order to achieve this object, the peripheral module has an asynchronous single-wire interface between one interface for the serial multiwire bus and the output stage.

The interface for the serial multiwire bus is preferably designed as a microsecond or an SPI interface. The asynchronous single-wire interface is preferably designed as a UART interface. This additional interface provided in the peripheral module makes it possible to transfer data, which are intended for the output stage and for forwarding to external means outside of the control unit, via the already existing serial multiwire bus. After having entered the peripheral device via the serial multiwire interface, the signals transporting these data are converted in the asynchronous single-wire interface into corresponding signals for the output stage and forwarded to it. The output stage notices no difference from the related art since it continues as before to receive signals from a UART interface or another type of asynchronous single-wire interface.

It is advantageous in particular that the present invention makes it possible to eliminate the lead between the UART interface in the computing device and the peripheral device. It is at least just as important that it is also possible to eliminate a pin on the peripheral module. The pin made free on the peripheral module may now be used for other tasks or functions. As an alternative, it is possible to use a more economical peripheral module having one pin fewer in the control unit for the same scope of tasks or functions.

DETAILED DESCRIPTION

Figure 2:
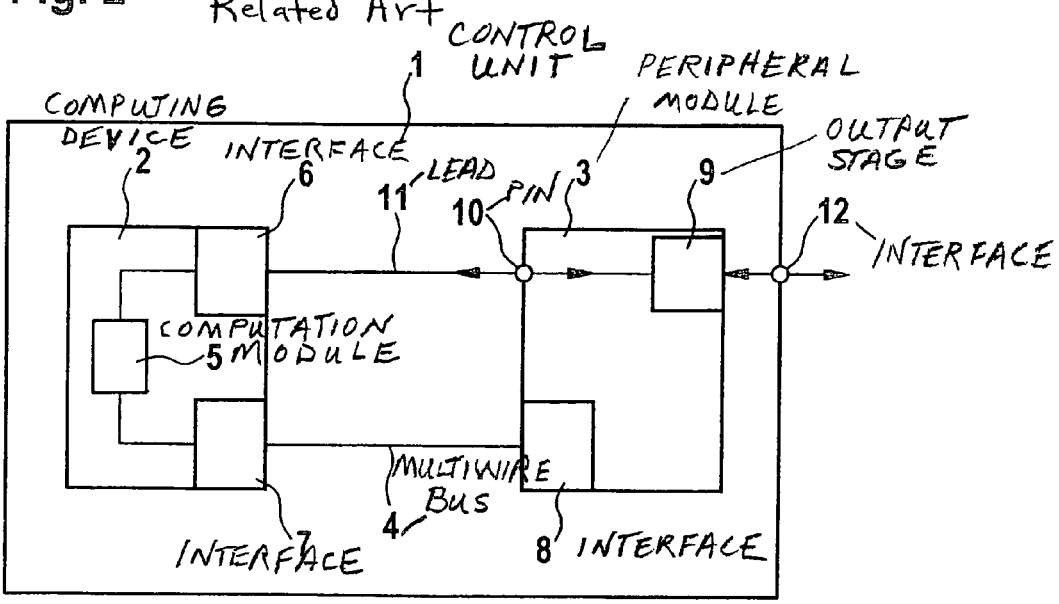
FIG. 2 shows a control unit known from the related art.

FIG. 2 shows a control unit known from the related art in its entirety denoted by reference numeral 1. Control unit 1 is preferably used for controlling and/or regulating functions in a motor vehicle, for example for controlling an internal combustion engine. Control unit 1 has at least one computing device 2 and at least one separate peripheral module 3. By way of an example, FIG. 2 shows only one computing device 2 and only one peripheral module 3. Computing device 2 may also be described as a microcontroller. Computing device 2 is connected to peripheral module 3 via a serial multiwire bus 4, which is designed for example as a microsecond bus.

Computing device 2 includes a computation module 5 which may also be described as a central processing unit (CPU). In addition, computing device 2 has a serial, asynchronous single-wire interface 6 which is designed, for example, as a UART (universal asynchronous receiver/transmitter) interface. Finally, computing device 2 also includes an interface 7 for serial multiwire bus 4.

In addition, peripheral module 3 has an interface 8 for serial multiwire bus 4 and at least one output stage 9. Only one example of output stages 9 is shown in FIG. 2. Output stage 9 is used for stepping up a signal arriving from computing device 2 to a battery voltage in the vehicle. In addition, peripheral module 3 includes a plurality of connections or pins of which one pin 10 is shown as an example in FIG. 2.

Asynchronous single-wire interface 6 of computing device 2 is connected to peripheral module 3 or output stage 9 via pin 10 and a lead 11.

In addition, peripheral module 3 has interfaces of control unit 1 to the outside, i.e., out of control unit 1 to external means. External means are, for example, sensors, diagnostic testers or a vehicle immobilizing system. Of these interfaces, only one interface 12 is shown as an example in FIG. 2.

Control units 1 of the type shown in FIG. 2 have a simple construction, are economical and used in particular in motor vehicles. A disadvantage of these known control units 1 is the fact that the separate lead 11 for communication between computing device 2 and peripheral device 3 must be provided via serial asynchronous single-wire interface 6. This lead must also be connected to separate pin 10 of peripheral module 3, thereby reducing the number of pins 10 available on peripheral module 3.

Figure 1:
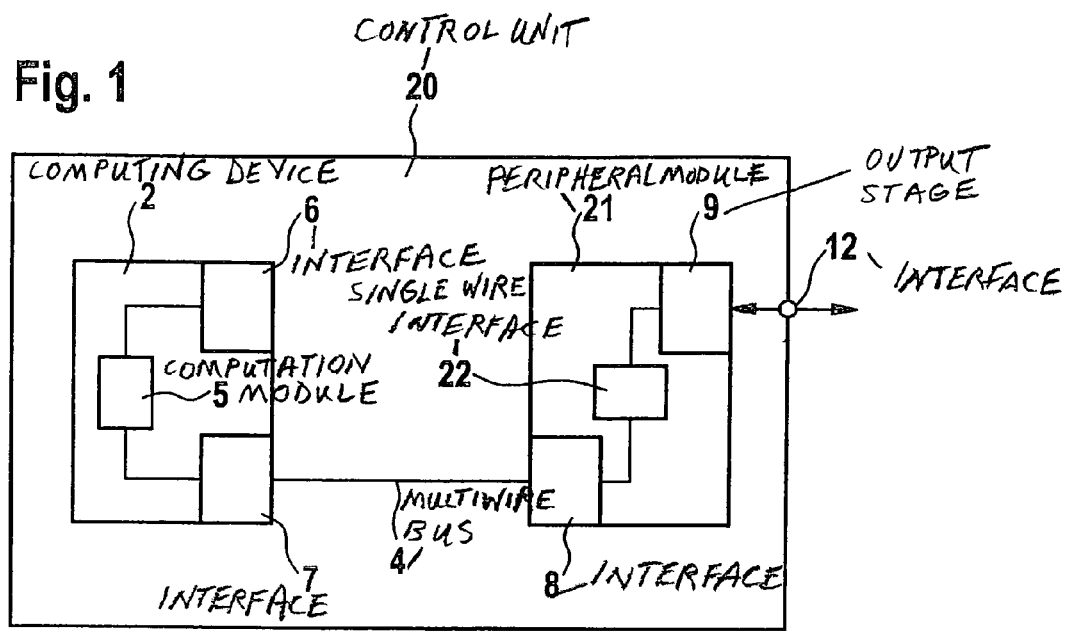
FIG. 1 shows a schematic view of the control unit according to the present invention.

FIG. 1 shows a control unit 20 according to the present invention including a peripheral module 21, which in addition to the components of peripheral module 3 of known control unit 1, has a serial asynchronous single-wire interface 22 which is designed, for example, as a UART interface. Asynchronous single-wire interface 6 is positioned between interface 8 for serial multiwire bus 4 and output stage 9. The present invention makes it possible to keep the number of pins necessary on peripheral module 21 low, thereby reducing the costs for entire control unit 20.

This additional interface 22 provided in peripheral module 21 makes it possible to transfer data, which are intended for output stage 9 and for forwarding to external means outside of control unit 20, via already existing serial multiwire bus 4. After having entered peripheral device 21 via serial multiwire interface 8, the signals transporting these data are converted in asynchronous single-wire interface 22 into corresponding signals for output stage 9 and forwarded to it. Output stage 9 notices no difference from the related art since it continues as before to receive signals from a UART interface, specifically from UART interface 22 of peripheral module 21 instead—as in the related art—from UART interface 6 of computing device 2.

It is advantageous in particular that the present invention makes it possible to eliminate lead 11 between UART interface 6 in computing device 2 and peripheral device 21. It is at least just as important that it is also possible to eliminate pin 10 on peripheral module 21. The pin made free on peripheral module 21 may now be used for other tasks or functions. As an alternative, it is possible to use a more economical peripheral module 21 having one pin fewer in control unit 20 for the same scope of tasks or functions.

What is claimed is:

1. A control unit for controlling and/or regulating at least one function in a motor vehicle, comprising:
    a controller arrangement, including at least one computing device and a serial multiwire interface;
    a serial multiwire bus; and
    at least one separate peripheral device connectable to the computing device via the serial multiwire bus, the peripheral device including an asynchronous single wire interface coupled between at least one output stage of the peripheral device and a serial multiwire bus interface of the peripheral device;
    wherein the serial multiwire bus interface of the peripheral device is connectable to the serial multiwire interface of the controller arrangement so that the peripheral device is capable of receiving serial data from the computing device transmitted over a data line of the serial multiwire bus and transferring the received serial data to the asynchronous single wire interface located in the peripheral device using a pin input of the serial multiwire interface of the peripheral device,
    wherein the asynchronous single wire interface is capable of converting the transferred serial data into universal asynchronous receiver/transmitter (UART) data and sending the UART data to the at least one output stage, and
    wherein there is no external single wire connecting the controller arrangement to the output stage of the peripheral device.

2. The control unit according to claim 1, wherein the peripheral device has a voltage supply for the control unit and/or interfaces to the outside for the control unit.

3. The control unit according to claim 2, wherein the serial multiwire bus is an SPI (serial peripheral interface) bus.

4. The control unit according to claim 2, wherein the peripheral module includes a clock signal arrangement for deriving a clock signal necessary for operating the asynchronous single-wire interface from a clock pulse of the serial multiwire bus.

5. The control unit according to claim 1, wherein the serial multiwire bus is a microsecond bus.

6. The control unit according to claim 1, wherein the serial multiwire bus is an SPI (serial peripheral interface) bus.

7. The control unit according to claim 1, wherein the peripheral device includes a clock signal arrangement for deriving a clock signal necessary for operating the asynchronous single-wire interface from a clock pulse of the serial multiwire bus.

8. The control unit according to claim 1, wherein the asynchronous single wire interface is a universal asynchronous receiver/transmitter (UART).

9. The control unit according to claim 1, wherein the serial multiwire bus is an SPI (serial peripheral interface) bus or a microsecond bus, and wherein the asynchronous single wire interface is a universal asynchronous receiver/transmitter (UART).

10. The control unit according to claim 2, wherein the serial multiwire bus is a microsecond bus.

11. A peripheral device for use in a motor vehicle, comprising:
    at least one output stage; and
    a serial multiwire bus interface capable of receiving serial data from a computing device in a controller arrangement in the motor vehicle transmitted over a data line of a serial multiwire bus and transferring the received serial data to a UART interface;
    wherein the serial multiwire bus interface of the peripheral device is connectable to the serial multiwire interface of the controller arrangement so that the peripheral device is capable of receiving serial data from the computing device transmitted over a data line of the serial multiwire bus and transferring the received serial data to the asynchronous single wire interface located in the peripheral device using a pin input of the serial multiwire interface of the peripheral device,
    wherein the asynchronous single wire interface is coupled between the at least one output stage and the serial multiwire bus interface that is capable of converting the transferred serial data into universal asynchronous receiver/transmitter (UART) data and sending the UART data to the at least one output stage, and
    wherein there is no external single wire connecting the controller arrangement to the output stage of the peripheral device.

12. The peripheral device according to claim 11, wherein the serial multiwire bus is an SPI (serial peripheral interface) bus or a microsecond bus.

13. The peripheral device according to claim 11, wherein the asynchronous single wire interface is a universal asynchronous receiver/transmitter (UART).

14. The peripheral device according to claim 11, wherein the serial multiwire bus is an SPI (serial peripheral interface)

bus or a microsecond bus, and wherein the asynchronous single wire interface is a universal asynchronous receiver/transmitter (UART).

* * * * *

UNITED STATES PATENT AND TRADEMARK OFFICE
CERTIFICATE OF CORRECTION

PATENT NO. : 8,713,225 B2 Page 1 of 1
APPLICATION NO. : 11/991774
DATED : April 29, 2014
INVENTOR(S) : Kneer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Twenty-ninth Day of September, 2015

Michelle K. Lee
*Director of the United States Patent and Trademark Office*